INVENTORS
Arthur Schwartz
George A. Arkwright, Jr.
Thomas D. Curtin
BY
ATTORNEYS

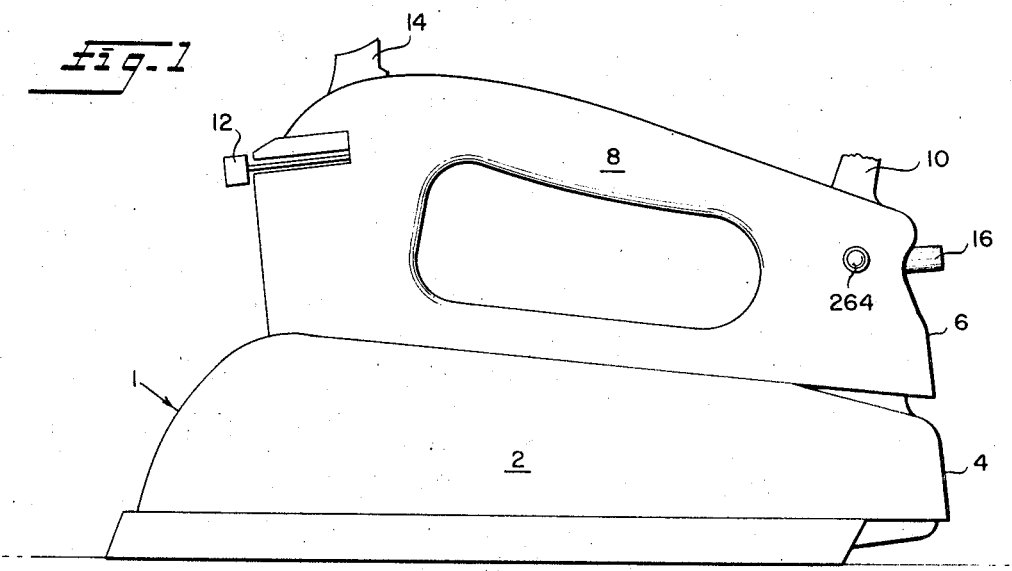
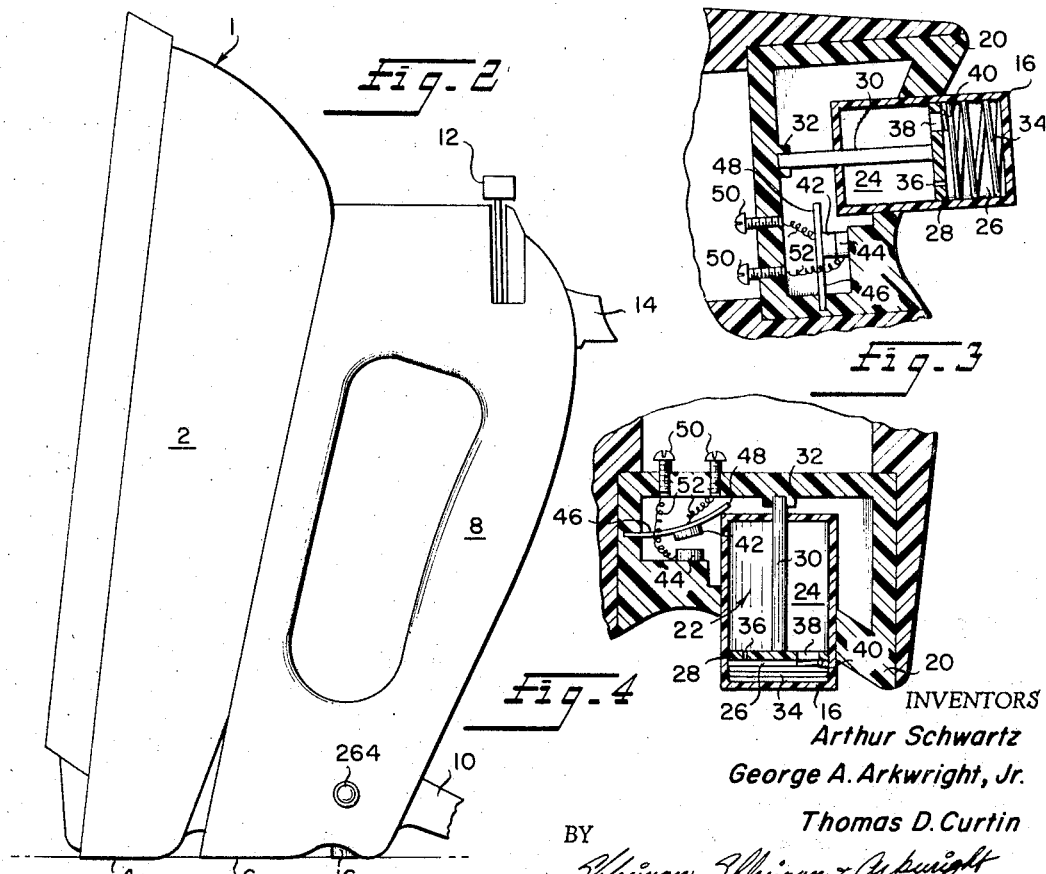
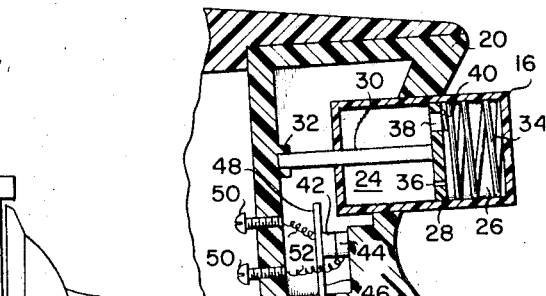
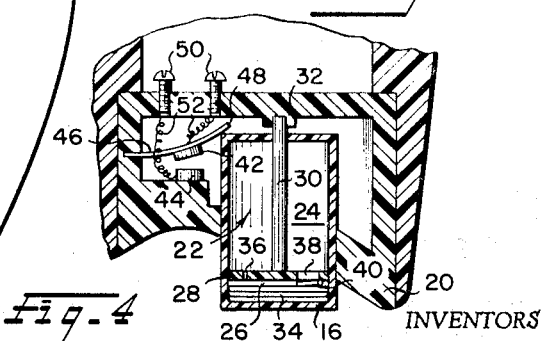

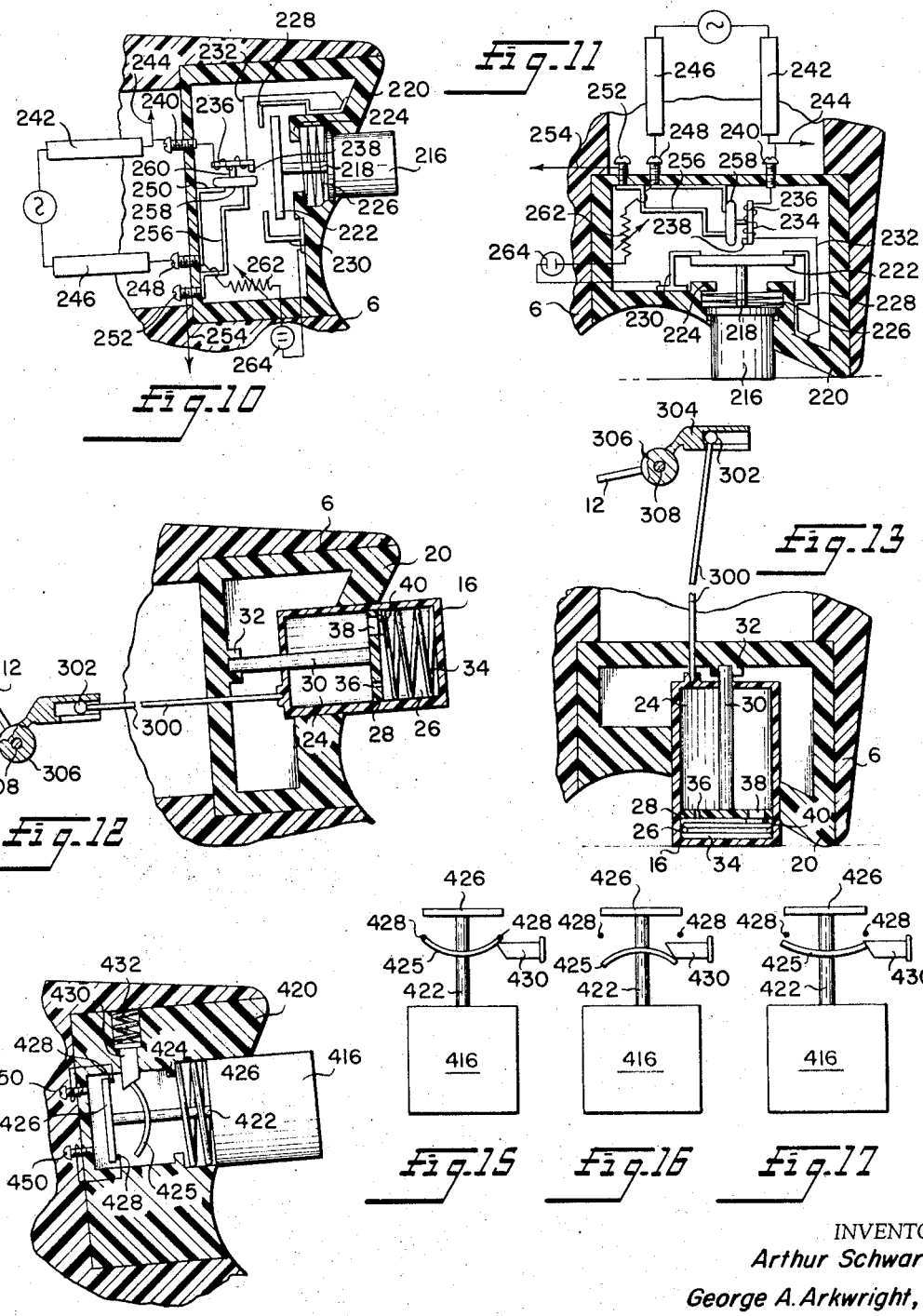

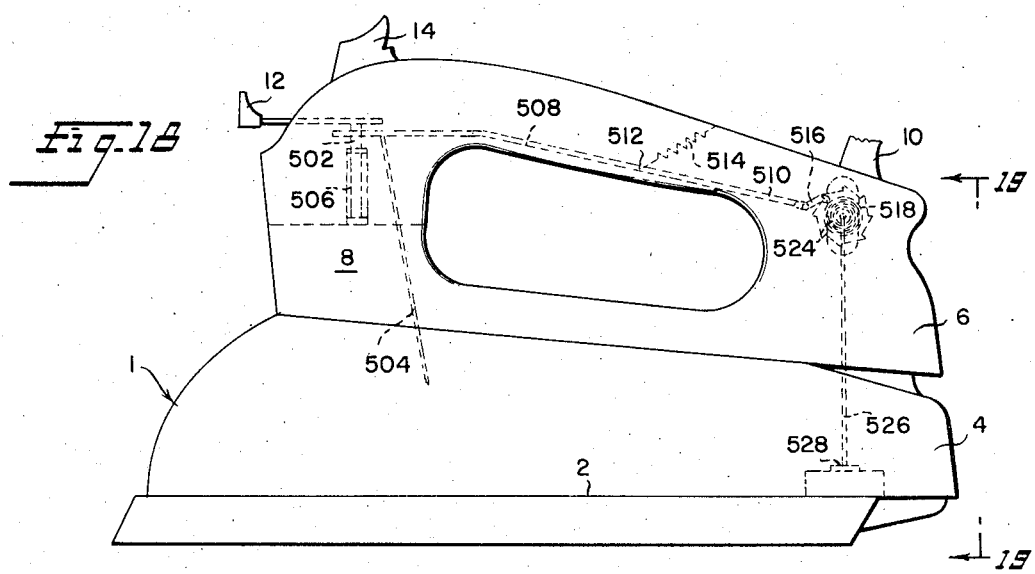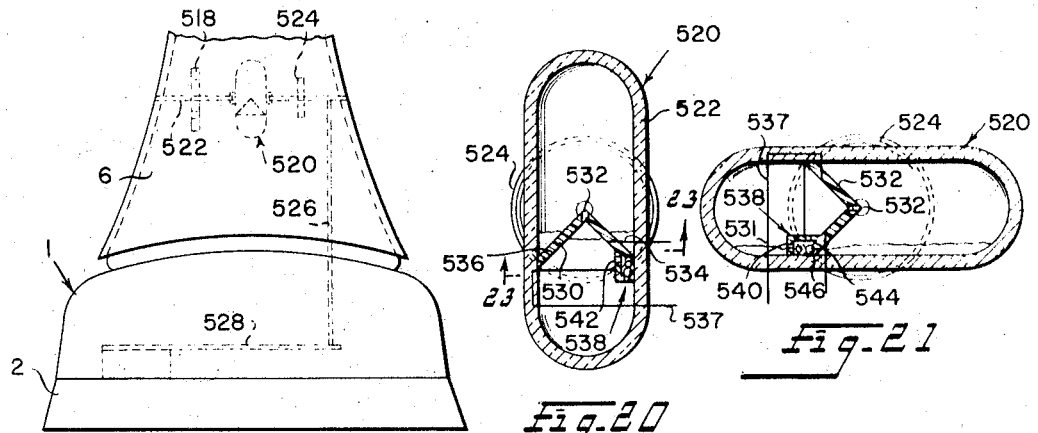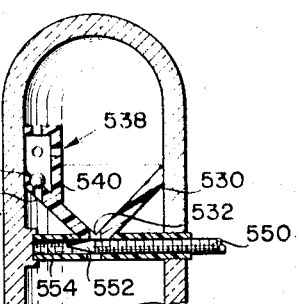

United States Patent Office 3,424,894
Patented Jan. 28, 1969

1

3,424,894
ELECTRIC IRON AND SAFETY DEVICE
THEREFOR
Arthur Schwartz, 660 Americana Drive, Annapolis, Md. 21403; George A. Arkwright, Jr., 6 Chickawane Court, Alexandria, Va. 22309; and Thomas D. Curtin, 5220 Elliott Road NW., Washington, D.C. 20016
Filed Oct. 22, 1965, Ser. No. 501,942
U.S. Cl. 219—250    19 Claims
Int. Cl. D06f 75/26

ABSTRACT OF THE DISCLOSURE

An electric iron having a sole plate and a heel, together with a heating load. Means for connecting the heating load to a source potential. Time delay means for interrupting the connecting means only at a set predetermined time after the iron is turned on its heel. The interrupting means has a rearwardly projecting means for operating the interrupting means, and the interrupting means is solely contained within the iron and is independent of manual manipulation of the interrupting means by the operator.

---

This invention relates to a safety shut-off device for manually operated electrically heated instruments or appliances. Since these units are used for a limited period of time and subsequently are left unattended, there is a possibility that the user will fail to turn off the electric current to the unit. This presents a fire hazard, particularly where such units are left near or in contact with combustible materials.

A particular example of such a unit is the ordinary electric heating iron used in the home. The hazard of fire is encountered in this instance where the housewife leaves her iron after use without turning it off.

In these instances the iron may be left for many hours and may result in the ironing board and room catching fire. This potentially dangerous condition has been recognized, and many electrical cut-off switch devices have been proposed. However, none of the previous switch devices have been used successfully in the standard iron because of drawbacks in operation which made it inconvenient and annoying to the user of the iron.

The present invention is directed to an electrical cut-off switch arrangement which is not inconvenient to the user, and is automatically operated only when the iron has been left on by the user. It employs a time delay electric cut-off switch system which operates only after the heating instrument has been in an inactive position for a given period of time.

Accordingly, it is a principal object of this invention to provide a safety device for electrical heating appliances to eliminate the fire hazard created by unattended units which have been turned off after use.

Another object is to provide a circuit cut-off device which will prevent the unnecessary waste of electric current when an iron is left on unintentionally. Since present day electric irons are rated at about 1100 watts, an unattended iron could waste power equivalent to leaving on ten to fifteen lamps. Therefore, the invention provides an obvious saving in electricity costs.

It is another object to provide a safety cut-off switch which is very simple, compact and economically adaptable to the currently designed electric irons.

A further object is to provide a safety device to automatically cut off an electric iron after a predetermined time delay which includes means on the handle which will not interfere with the operator's use of the iron or require any attention or undue effort.

Further, the invention provides a device having a button on the handle to operate a time delay switch. This button will call attention to the safety feature and provide sales appeal for the iron.

It is still a further object of this invention to provide an electrical cut-off circuit for an electrically operated heating appliance which will operate only after the appliance has been in use and has been left on by the user.

It is a further object of this invention to use the stored inactive position of a heating appliance as a means of activating a safety electrical cut-off switch assembly.

Another object of this invention is to provide a time delay electrical cut-off switch circuit for a heating appliance after the appliance has been used for a small period of time.

A still further object of this invention is to provide a circuit operating switch assembly in an appliance which will operate automatically without requiring a special action on the part of the user.

Another object of this invention is to provide an automatic safety circuit interrupter for the electric iron used in the home.

A still further object of this invention is to use a simple, compact cut-off switch assembly which can readily be used with standard manufactured heating appliances without requiring extensive modification thereof.

Yet a further object of this invention is to provide a cut-off switch assembly which is initially activated by a contact button which is depressed when the appliance is placed in an inactive, stored position.

A still further object of this invention is to provide a time delay circuit breaking switch assembly in the heating element circuit which is activated by movement of the heating unit to a stored, inactive position.

A still further object of our invention is to provide a cut-off switch assembly for a heating instrument in which the time delay is controlled by a thermostatic element.

Another object of this invention is to provide a mercury-operated time delay switch which will interrupt the circuit to the heating elements when the appliance is not in use and in a stored position, but on movement of the appliance from the stored position will immediately close such circuit.

A further object of this invention is to provide a time delay circuit interrupting switch assembly which opens the heater circuit of a heating instrument a short time after the instrument is placed in a stored, inactive position, but which will instantly close such circuit when the instrument is moved from the stored, inactive position.

The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawings in which:

FIGURE 1 is a side elevation view of the iron in its operating position;

FIGURE 2 is a view similar to FIGURE 1 of the iron in its rest position;

FIGURES 3 and 4 are section views of one modification of the invention shown in its two positions;

FIGURES 10 and 11 are section views of a fourth modification shown in its respective operating positions;

FIGURES 12 and 13 are section views of a mechanical modification of the invention shown in its respective operating positions;

FIGURES 14–17 are section views of still another modification shown in its various operating positions;

FIGURE 18 is a side view of another modification;

FIGURE 19 is an end view of FIGURE 18;

FIGURES 20–22 are section views of the switch used in FIGURES 18 and 19;

FIGURE 23 is a cross-section taken along line 23—23 of FIGURE 20; and

FIGURE 24 is a modification of the switch shown in FIGURES 20–23.

Figure 5:
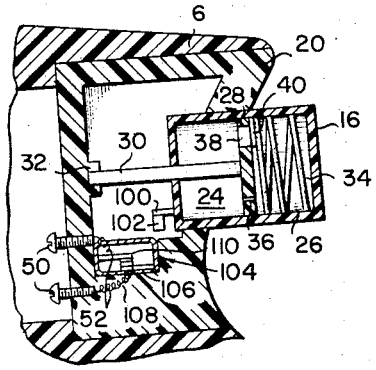
FIGURES 5 and 6 are section views of another modification shown in its two positions.

*Broad description of FIGURES 1 and 2*

Referring to the drawings, wherein corresponding reference characters indicate corresponding parts throughout the several views of the drawings, numeral 1 designates an iron according to the invention. The iron 1 has a sole plate 2 and a heel section 4. The iron is seen resting on the sole or in its ironing position in FIGURE 1 and in its upright or resting position in FIGURE 2. In FIGURE 2 the iron rests on heel 4 and a rear portion 6 of a handle 8.

The iron disclosed is a conventional steam and dry iron having an electrical cord 10 connected to a conventional heating load and thermostat in the sole plate (not shown). Connected to the thermostat in the usual manner is a temperature regulating control operator 12. Also seen in FIGURES 1 and 2 is a conventional steam operating button 14. Located in the rear portion 6 of handle 8 is a switch operating button 16 which will be discussed more fully in connection with the various species disclosed.

*Dash-pot operated time delay cut-off of FIGURES 3 and 4*

Reference will now be made to the species of FIGURES 3 and 4 wherein button 16 is located in a switch housing 20 which is easily and conveniently placed in the rearward recessed portion of handle 8. Within button 16 is a time delay means illustrated as a dashpot 22. The dashpot has two chambers 24 and 26 separated by a piston member 28. The piston 28 is held stationary relative to housing 20 by means of a rod 30 anchored to the housing at 32. The button 16 is urged outwardly by a spring 34. Located on the piston 28 is a relatively small opening 36 and a much larger opening 38. Connected on side of chamber 26 is a flap valve 40.

Also located within housing 20 is a switch schematically represented by contacts 42 and 44. Contact 44 is fixedly mounted in the switch housing, and contact 42 is resiliently mounted on arm 46. Extending outwardly past the contacts is a portion 48 which is adapted to engage the button 16 when it has been completely depressed. Contacts 42 and 44 are connected to a pair of terminals 50 by wires 52. The entire switch is connected in series with the heating load and thermostat in the iron.

*Operation of FIGURES 3 and 4*

In operation, when the iron is in the position of FIGURE 1, the button 16 is in its outward position (FIGURE 3). However, when the iron is placed on its heel, the button 16 is gradually depressed against spring 34 forcing fluid slowly from chamber 26 through opening 36 into chamber 24. The flap valve 38, 40 is forced into the closed position. As this occurs, the button slowly moves toward extension 48 of switch arm 46. After a preselected time delay, determined by the size of opening 36 and the travel distance to extension 48, the switch contacts 42, 44 open and the circuit to the iron is broken.

When the iron is picked up, the spring pushes the button immediately outward forcing fluid through both openings 36 and 38. As noted above, the flap 40 will close the opening 38 during inward movement of the button, and it will be forced open during outward movement. Therefore, current will be cut off a preselected period of time after the button is depressed and quickly restored when button is released.

Figure 6:
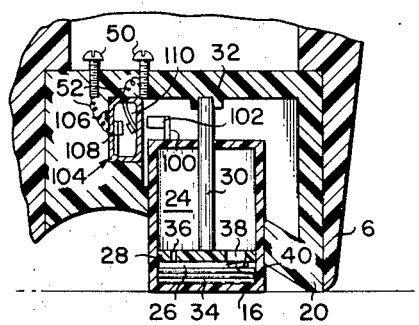

*Magnetically operated time delay cut-off of FIGURES 5 and 6*

Referring now to FIGURES 5 and 6, the push button and time delay mechanism is disclosed as being identical to that shown in FIGURES 3 and 4. Therefore, a discussion of this portion of the drawing need not be repeated.

Mounted on the push button 16 is a rod 100 projecting into the switch housing 20. Mounted on the rod 100 is a permanent magnet 102. After the appropriate time delay the magnet 102 will move alongside an encapsulated reed-type switch 104. This switch has a non-metallic casing of glass or plastic or the like 106 which has a pair of contacts 108 and 110 mounted therein. As seen in FIGURE 6 when the magnet 102 moves alongside the switch 104, movable contact 110 which is spring biased against contact 108 is disengaged thus breaking the circuit.

The operation of the time delay is identical to that in FIGURES 3 and 4 in that after the predetermined time delay the switch 104 will cut off current flowing to the heating load and the thermostat.

Figure 7:
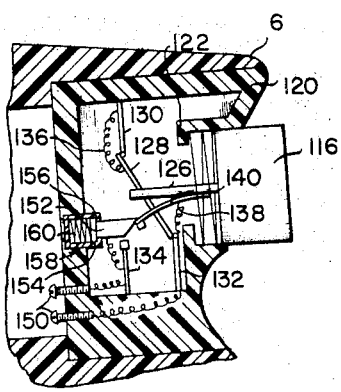
FIGURES 7–9 are section views of a third modification shown in its respective operating positions.
Figure 8:
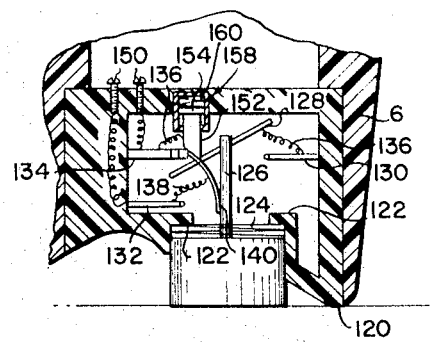
Figure 9:
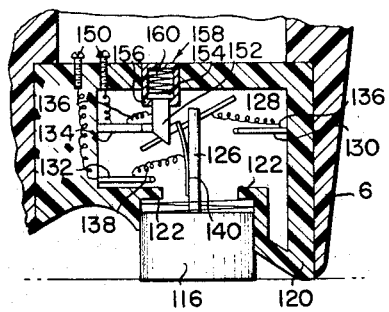

*Thermal time delay cut-off of FIGURES 7–9*

As see in FIGURES 7–9 a switch housing 120 is positioned in the rear portion 6 of the handle 8. The housing has a pair of projections 122 on the interior surface thereof. These provide a seat for limiting the inward movement of switch button 116 and provide also an abutment for spring biasing means 124. Mounted on the push button 116 is a shaft 126 of insulating material, which in turn has a conductive bridging member 128 mounted near the end thereof.

As seen in FIGURE 7 the bridging member 128 is adapted to contact stationary conductive members 130 and 132. A third stationary contact 134 is mounted in the housing 120 and electrically connected to contact 130 by means of suitable conductors shown as 136. Electrically connected to the contact 132 through a wire 138 is a bi-metal switch contact 140. The contacts 132 and 134, and thus bi-metal 140 and stationary contact 130, are connected to terminals 150 which provide a circuit connecting means between the source of electrical potential and the heating load.

Also mounted within the switch housing 120 is a spring biased insulating member 152. This insulating member should be of a very high melting point material such as Teflon. The insulating member 152 has an abutment means 154 to engage projections 156 in a receptacle type means 158. The insulating portion 152 is biased by means of a spring 160.

*Operation of FIGURES 7–9*

In operation, the push button 116 is biased in an outward direction by spring 124 as seen in FIGURE 7. In this position bridging member 128 completes a circuit through contacts 130 and 132. Therefore, the iron will be in an operating or heating condition.

When the iron is placed on its heel, the push button 116 is depressed immediately disengaging the bridging member 128. At this point, as seen in FIGURE 8, the bi-metal switch contact 140 pushes the Teflon member slightly upward in its receptacle 158 against the bias of spring 160. The bi-metal contact 140 also contacts stationary contact 134. Therefore, the circuit will remain completed to the electric heating load. As the bi-metal 140 slowly heats up due to the current flowing therethrough, it will subsequently snap in the known manner. This will exert a bias on the beveled edge of Teflon member 152 thus forcing it farther upward against the spring 160. The bi-metal 140 will then snap backward a sufficient distance to allow the Teflon member to be forced downward between the contact 140 and stationary contact 134. This will make it impossible for the switch to recycle; that is, when the bi-metal 140 cools it will not be able to recontact the stationary member 134.

When the operator picks up the iron the bridging member 128 will immediately close the circuit to contacts 130 and 132 thus restarting the iron.

Variable thermal time delay cut-off circuit of FIGURES 10 and 11

Referring to FIGURES 10 and 11, a button 216 is mounted in a housing 220 located within the end portion 6 of the handle. Push button 216 has a shaft 218 mounted thereon and an electrical bridging member 222 at the end thereof. The housing has a pair of inwardly directed flanges 224 which are adapted to limit the inward movement of button 216 and provide an abutment for biasing spring 226 which pushes the button in an outward direction as seen in FIGURE 10.

Engaging bridging member 222 are a pair of contacts 228 and 230. Contact 228 is connected through wire 232 to a heater 234. The heater is adjacent to or wound around a bi-metal element 236 which pivots on point 238. Heater 234 is then connected to a terminal 240 which in turn is connected to a bus bar 242 commonly found in the handles of conventional irons. Also connected to the bus bar 242 is a line indicated by 244 which carries current to one side of the thermostat and heating load element.

Connected to a second bus bar 246 is another terminal 248, attached to which is a stationary contact 250. A third terminal 252 is mounted on the housing 220 and is connected to a second conductor 254 leading to the other side of the heating load. Also connected to the terminal 252 is a line 256 leading to a contact 258 which is rigidly connected to the bi-metal 236 by means of a shaft 260.

Attached to the terminal 248 is a variable resistance or potentiometer 262. As will be seen, this resistance varies the flow of current and creates a voltage drop to the heater on the bi-metal. Connected in series with variable resistance or rheostat 262 is a lamp 264 which is mounted on the outside surface of the handle as seen in FIGURES 1 and 2. It may also be pointed out here that an operator or dial for the variable resistance 262 may appear or be placed on the outside of the handle casing adjacent the light.

Operation of FIGURES 10 and 11

In operation, the contact 258 ordinarily is in the closed position, thus providing current from bus bar 246 through terminal 248 to contact 250, through contact bridging member 258 and line 256 to the terminal 252. From here the current flows through line 254 to the heating load and thermostat and then back to bus bar 242 through line 244.

When the iron is inverted as seen in FIGURES 2 and 11, push button 216 immediately bridges contacts 230 and 228 through member 222. It will be noted that current will flow in a parallel circuit from bus bar 246 through terminal 248 into rheostat 262 and through lamp 264. It will then flow from lamp 264 through contacts 230, 222 and 228 and hence through line 232 and heater 234 to terminal 240 and back to the second bus bar 242.

After a sufficient amount of time set by the variable resistance 262 and by the selection of the bi-metal and heater elements 234 and 236, the bi-metal will pivot on point 238 and open contact 258, thus cutting the current off to the heating load. The light can be selected, together with the other circuit parameters, so that it will either go on immediately or preferably go on when the current is cut off to the iron. It will be apparent that current will always flow through the heater so long as the iron is plugged in. However, after a suitable period of time the iron will be turned off and the signal light will indicate to the operator that the iron should be turned off and unplugged.

It is obvious that in place of the heater a thermal current bi-metal could be used with current flowing through the bi-metal itself.

A more advantageous circuit would be to connect terminal 240 to the electric iron circuit between the thermostat and the heating load. In this manner when the operator turned off the iron there would be no more current flowing through any of the elements in the device, even if the plug were left in. In this instance the light 264 would only go on a predetermined time after the iron was placed on its heel to indicate that the iron was still left in the "on" position even though the circuit to the heating load had been broken. If the operator turned off the iron, which is the recommended procedure, then all current to all elements including the light would be disconnected.

Mechanically operated time delay cut-off of FIGURES 12 and 13

Referring to FIGURES 12 and 13 it will be noted that the switch housing and time delay mechanism is identical with that shown and described in relation to FIGURES 3 and 4. Therefore, this portion need not be discussed again.

Connected to button 16 is a rod 300 having an operator engaging means illustrated as a ball 302 on the end thereof. This engages a ball receiving member 304 which in turn is connected to the operator 12 through a circular connecting member 306. In the conventional iron a shaft 308 is rotatably connected to the temperature control on the thermostat so that by rotation of operator 12 the iron can be turned on and off and the temperature regulated.

In operation, when the iron is in the position shown in FIGURE 1, operating rod 300 and button 16 are in the position shown in FIGURE 12. When the iron is placed on its heel as seen in FIGURE 2 the button is slowly depressed after a suitable time delay as discussed in regard to FIGURES 3 and 4. The depression of the button, after a predetermined slack time, will force ball 302 into engagement with member 304. This will slowly return the thermostat operating member 12 and hence the thermostat switch back to its "off" position as seen in FIGURE 13. It will be apparent that this is a simple direct mechanical connection to the operating member of the thermostat. In another example, the rod 300 might be connected directly to the thermostat to move it to its "off" position.

Thermal time delay cut-off of FIGURES 14–17

Referring now particularly to FIGURE 14, a button 416 is mounted within a housing 420. The button includes a shaft 422 extending inwardly of the exterior of the housing. Inward movement of the button is limited by a pair of flanges 424 which cooperate with spring 426 to urge the button in an outward position as seen in FIGURE 14. Attached to the shaft 422 is a bi-metal disc contact 425 and a conducting bridging member 426.

In the position shown in FIGURE 3 bridging member 426 engages contact members 428. Projecting into the interior of the housing is an insulated member 430 which is biased by a spring 432. Contacts 428 are connected to terminals 450 which are in series with the heating load of the iron.

Operation of FIGURES 14–17

In operation, when the iron is in the position seen in FIGURE 1, bridging member 426 normally closes the contacts 428 to carry current to the heating load of the iron. When the iron is placed on its heel as seen in FIGURE 2, bridging member 426 immediately breaks contact with 428 and the bi-metal disc shaped member 425 bridges the contacts 428. As current continues to flow through the contacts and the bi-metal disc, heat is carried to the iron in a substantially continuous manner. However, when the disc heats to a predetermined level after a predetermined period of time, it will snap as seen in FIGURE 16. It will be noted that at this time the spring 432 forces the insulating member which may be of Teflon as discussed in the previous modifications into engagement between the contact 428 and the disc 425. When the disc cools and attempts to return to its previous position the Teflon member will have sufficient bias on it to prevent the disc from making complete contact back to the contacts 428. When the iron is again picked up, the spring 426 will force the button back out and contact will be made through bridging member 426. There is sufficient bias on the Teflon member 430 so that it takes the pushing of the button inwardly to move the Teflon out of the way originally. When the bi-metal cools there will not be sufficient force to move the Teflon member back and it will block at least the right side of the disc from making contact with the right hand contact 428.

*Conductive fluid time delay cut-off of FIGURES 18 and 19*

Referring to FIGURE 18, the operating handle for the thermostat control is seen at 12. Operating handle 12 is connected to a shaft 502, which in turn is connected to the thermostat operating and control mechanism 504. Shaft 502 rests in a suitable mounting means seen at 506.

Also connected to the shaft 502 is a chain or connecting rod 508. Chain 508 is connected to a solid rod 510 at a point seen at 512. The mechanism is held in its location by a tensioning spring 514. At the end of rod 510 is an S-shaped pawl 516 mounted in an escapement mechanism including a guide or pivot point 517 cooperating with a ratchet 518 as will be further discussed below.

Referring now to FIGURE 19, mounted in the rear portion 6 of the handle is a conductive fluid time delay switch seen at 520. The fluid conductive time delay switch is rotatably mounted on a shaft 522. It will be noted that the ratchet 518 is also rigidly secured to the same rod. Also mounted on the rod 522 is a biasing spring 524 seen as a coil in dotted lines in FIGURE 18 and as an end view in FIGURE 19. A connecting rod 526, preferably of Teflon or nylon is connected at one end to the shaft 522 and to a bi-metal 528 at the other end. The bi-metal strip is mounted adjacent to the heating load and is directly affected by the temperature of the load.

*Conductive fluid time delay switch of FIGURES 20–24*

Referring particularly to FIGURES 20–23 it will be seen that the conductive fluid time delay switch 520 has a casing or capsule 522 of an electrically non-conductive material such as glass. Inside the casing 522 is an electrically non-conducting funnel or cone member 530 which has an opening 532 in the apex of the cone. The size of the opening is selected to obtain a predetermined time delay as will be discussed more fully in the overall operation below.

Also within the capsule is located a pair of contacts 534 and 536. These contacts are located on the interior surface of the funnel 530. A bare wire 537 is connected to contact 536 and extends across the interior of the casing. A check valve, as best seen in the modification of FIGURE 24, includes a housing 540 having a plurality of openings 542 located therein. The funnel has an opening leading into the check valve chamber seen at 544. A ball 546 is used to block the opening 544 in the funnel in the manner discussed below.

Seen in FIGURE 24 is a modification of the time delay conductive fluid switch which is identical to that shown in the modifications of FIGURES 20–23. In this modification the size of the opening 532 is regulated by a threaded member 550. The threaded member has a tapered point 552. By screwing the threaded member 550 within cooperating threads 554 the opening 532 is varied, thus regulating the amount of fluid flowing through opening 532 during a given period of time. The advantage of this type of regulating means will become apparent with the discussion of the overall device below.

*Operation of FIGURES 18–24*

When the iron is located in the position shown in FIGURE 18 and when the thermostat is in the off position, the conductive fluid time delay switch 520 is in the position shown in FIGURES 18, 19 and 20. The fluid is of such a quantity and at such a depth that the contacts 534 and 536 are bridged thereby. When the iron is turned to the "on" position, contact is made through the thermostat and through the conductive switch to a source of electrical potential. As the iron heats, bi-metal 528 will expand in an upward direction and will move operating rod 526 upward. The rod moving up will cause the switch apparatus to rotate on rod 522. This is accomplished by a projecting member connected to rod 522 which extends outwardly and to which the upwardly extending rod 526 connects, thus providing a lever to rotate the rod 522. Therefore, the time delay switch moves to the position shown in FIGURE 21.

It will be noted that electrical contact is made through wire 537 which extends across the capsule and with the contact 534.

When the iron is placed on its heel in the rest position, the fluid will slowly drain out through opening 532.

When the bi-metal cools, it will be noted that the conductive switch mechanism will be urged back to its original position by the spring 524. However the pawl 516 engaging ratchet 518 prevents such a return movement. When the operator 12 is returned to its "off" position chain 508 holds the rod 510 and pawl 516 out of engagement with the ratchet. This is done by the escapement mechanism or the movement of the S-shaped pawl over a guide or pivot point 517. As the operating handle and thermostat is turned "on," the spring 514 holds or urges the pawl back up over the point 517 and into engagement with the ratchet. Also the pawl 516 is gravity operated to the extent that it will fall back into the engaged position with the ratchet. This of course only occurs when the iron is on its end or rotated onto its heel.

*Other modifications*

It is possible within the scope of this application to include a fluid conductive time delay switch of the type shown mounted on a weighted operator which will assume its position when the iron is rotated on its heel.

The bi-metal type thermal relay in the modification shown in FIGURES 10 and 11 could obviously be a thermistor. Also, rather than a thermal relay, an electromagnetic relay with a built in time delay, as is commonly known in the art, may be included. It would also be within the scope of this invention to include an R-C time delay circuit. It may be necessary to utilize a cascaded R-C circuit with neon or flash tubes to obtain the longer types of time delay.

Also, in place of the push-button contacts in FIGURES 10 and 11, for example a piezoelectric element could be used. By placing the iron on its heel the pressure on the piezoelectric element would cause current to flow in a manner similar to the switch.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described our invention, we claim:
1. An electric iron comprising:
 (a) a sole plate and a heel,
 (b) a heating load,
 (c) means for connecting said heating load to a source of electric potential,
 (d) time delay means for interrupting said connecting means only at a set predetermined time after said iron is turned on said heel, (e) said interrupting means having rearwardly projecting means for operating said interrupting means and said interrupting means being solely contained within the iron and the operation of said interrupting means being independent of any manual manipulation of said interrupting means by the operator.

2. An electric iron as defined in claim 1, wherein said interrupting means includes a thermal relay.

3. An electric iron as defined in claim 2, wherein said thermal relay includes a bimetal element, a bimetal heater positioned adjacent said bimetal element, said bimetal heater connected in parallel with said heating load, switch means for energizing said heater upon rotation of the iron on said heel.

4. An electric iron as defined in claim 3, having a handle wherein said energizing means includes a switch mounted in said handle and operated when the iron is rested on both said heel and said handle.

5. An electric iron as defined in claim 2, wherein said thermal relay includes a thermistor.

6. An electric iron as defined in claim 2, wherein said thermal relay includes a bimetal.

7. An electric iron as defined in claim 2, wherein said thermal relay includes a thermal responsive means and a thermal heater adjacent said thermal responsive means.

8. An electric iron as defined in claim 2, including an indicator in series with said thermal relay.

9. An electric iron as defined in claim 2, including an adjustable resistance in series with said thermal relay.

10. An electric iron as defined in claim 7, wherein said thermal responsive means is a bimetal.

11. An electric iron as defined in claim 1, including:
(a) a switch housing,
(b) a circuit connecting switch in said housing,
(c) a thermal responsive means movably mounted in said housing and connected to said circuit connecting switch,
(d) a normally open position responsive switch mounted in a wall of said housing,
(e) three terminals mounted on said housing,
(f) said circuit connecting switch being connected across first and second of said terminals,
(g) said thermal responsive means being connected across said second and third terminals.

12. A time delay switch as defined in claim 11, including an indicator light in said thermal responsive means circuit operable when said circuit connecting switch is open.

13. An electric iron as defined in claim 1, including:
(a) a housing,
(b) a pair of terminals on said housing, (c) a biased operating member,
(d) a first bridging member on said operating member normally electrically connecting said terminals,
(e) a thermal current responsive bridging member on said operating member adapted to electrically connect said terminals upon movement of said operating member,
(f) an electrically insulated member mounted on said housing adjacent said thermal current responsive bridging member, said insulated member being spring biased into engagement with said thermal current responsive bridging member.

14. An electric iron as defined in claim 1, including a thermostat means connected to said heating load, said interrupting means turning said thermostat to an off position at said predetermined time.

15. An electric iron as defined in claim 2, wherein said thermal relay is connected in parallel with said heating load.

16. An electric iron as defined in claim 14, including a handle mounted on said sole plate, a dashpot mounted in said handle and means for connecting said turning means to said dashpot.

17. An electric iron as defined in claim 1, wherein said interrupting means includes a permanent magnet operated switch.

18. An electric iron comprising:
(a) a sole plate and a heel,
(b) a heating load,
(c) means for connecting said heating load to a source of electric potential,
(d) means for interrupting said connecting means only at a set predetermined time after said iron is turned on said heel,
(e) said interrupting means including a dashpot operable when the iron is turned on said heel.

19. An electric iron as defined in claim 1, wherein said rearwardly projecting means is a push button.

References Cited
UNITED STATES PATENTS

| | | | |
|---|---|---|---|
| 1,683,252 | 9/1928 | Madigan | 219—257 X |
| 2,364,433 | 12/1944 | Finlayson | 219—251 X |
| 2,833,903 | 5/1958 | Waddell | 219—251 X |

RICHARD M. WOOD, *Primary Examiner.*

C. L. ALBRITTON, *Assistant Examiner.*

U.S. Cl. X.R.

38—82; 200—34; 219—251, 252, 504, 505